United States Patent [19]

Gancarcik

[11] Patent Number: 5,432,791

[45] Date of Patent: Jul. 11, 1995

[54] DEVICE FOR SYNCHRONIZING SYSTEM CLOCK USING DETECTED SYNCHROMIZATION SIGNAL

[75] Inventor: Ed Gancarcik, Ottawa, Canada

[73] Assignee: Mitel Corporation, Kanata, Canada

[21] Appl. No.: 185,821

[22] PCT Filed: Jul. 22, 1992

[86] PCT No.: PCT/CA92/00317

§ 371 Date: Jan. 21, 1994

§ 102(e) Date: Jan. 21, 1994

[87] PCT Pub. No.: WO93/82513

PCT Pub. Date: Feb. 4, 1993

[30] Foreign Application Priority Data

Jul. 23, 1991 [CA] Canada ................................ 2047641

[51] Int. Cl.⁶ .............................................. H04J 3/06
[52] U.S. Cl. ............................. 370/105.2; 370/105.1; 370/110.1; 375/356; 375/357
[58] Field of Search ............... 370/100.1, 105.3, 110.1, 370/103, 13, 105.1, 105.2; 375/106, 107, 108, 116, 111, 109

[56] References Cited

U.S. PATENT DOCUMENTS

| | | | |
|---|---|---|---|
| 4,627,047 | 12/1986 | Pitroda et al. ................. | 370/110.1 |
| 4,628,493 | 12/1986 | Nelson et al. ................. | 370/100.1 |
| 4,736,393 | 4/1988 | Grimes et al. ................. | 375/108 |
| 5,184,348 | 2/1993 | Abdelmouttalib et al. ...... | 370/110.1 |
| 5,274,678 | 12/1993 | Ferolito et al. ................. | 375/108 |
| 5,331,667 | 7/1994 | Izumi .................................. | 375/108 |

Primary Examiner—Douglas W. Olms
Assistant Examiner—Shuck Hom
Attorney, Agent, or Firm—Marks & Clerk

[57] ABSTRACT

A digital switching system comprises a plurality of digital interface cards for connection to a public telecommunications network, each card including at least one digital interface circuit with a synchronization detector for detecting a network synchronization signal. A control unit includes a system clock having a clock synchronization input. A a system bus carries data through the switching system and is connected between the interface cards and the control unit. A switch in the interface cards is operative in response to control data from the control unit and carried over the system bus in an overhead channel to connect the synchronization detector of a selected active digital interface circuit to the clock synchronization input of the system clock over a clock synchronization line so as to pass detected synchronization signals on the active circuit directly thereto. The system clock can thus be brought directly into synchronization with the detected synchronization signal of the active interface unit.

4 Claims, 2 Drawing Sheets

DEVICE FOR SYNCHRONIZING SYSTEM CLOCK USING DETECTED SYNCHROMIZATION SIGNAL

BACKGROUND OF THE INVENTION

1. Field of the Invention

This invention relates to a digital switching system for connection to a public telecommunications network via digital circuits.

2. Description of the Prior Art

There is an increasing trend towards the digitization of the public telephone network due to the many advantages that digital systems can offer, such as ease of switching, lower maintenance, quality and flexibility. With ISDN (Integrated Services Digital Network) digitization is being taken direct to the customer via a standard twisted pair that will offer a 192 kbps basic rate circuit, consisting of two 64 kbps bearer channels and one 16 kbps data channel (2B+D). With ISDN the customer has direct access to digital services without the need for the present analog link between the customer terminal and the central office.

With the advent of ISDN, there is a need for switching systems that can interface directly with basic rate circuits. Although digital switching systems have been in use for some years, such systems interface with the public network through conventional analog lines. The systems comprise a system clock and a data carrying bus, generally a 2,048 Mbps serial bus, known as an ST bus, which carries thirty-two channels per frame.

When such systems are connected to the public network by digital circuits, some means has to be found to synchronize the system clock to the clock rate of the connected digital channel so as to allow error-free data transfer to take place. Conventionally this is done by by comparing the phase of the system clock with the phase of the clock signals on the connected circuit at the circuit interface, i.e. the basic rate interface card. A phase status word (psw) is then generated to represent the phase difference between the circuit clock and the system clock. This phase status word is transmitted through the system bus to the common control unit, where software is used to extract the phase difference information from a phase status word. This information is then used to vary the rate of the system clock so as to minimize the phase difference and thereby bring it into synchronization with the clock signals on the digital circuit.

The problem with this system is that it requires considerable bandwidth to transport the phase status word to the system clock and substantial processing power in order to extract the phase information from the phase status words. Also, since high frequency circuits are required at the interface units in order to effect phase comparison, electromagnetic interference can be significant since it is hard to adequately shield the interface units.

A typical example of such a system is described, for example, in EP-0368123. It will be seen that in this system the clock signals are all trasmitting through the system bus with the consequential high overhead in bandwith and processing power.

An object of the present invention is to alleviate the aforementioned disadvantages.

SUMMARY OF THE INVENTION

According to the present invention there is provided in a digital switching system connectable to a public telecommunications network via any one of a plurality of digital circuits and comprising a control unit including system clock and a system bus for carrying data through the system, an arrangement for synchronizing said system clock with a selected digital circuit, comprising means for detecting a network synchronization signal on said digital circuit, means for routing said detected synchronization signal directly to said system clock, and means for bringing said system clock into synchronization with the detected synchronization signal routed thereto.

By routing the synchronization signals directly to the system clock, the complex circuits required to transport phase status words can be eliminated. Also, since no high frequency comparison is done at the interface unit, electromagnetic interference can be reduced because the high frequency circuits are located in the main control unit, where EMI shielding is much more effective. Only one high frequency circuit is required in the system, rather than one per circuit as is the case in the prior art.

The above described arrangement can be applied to a U-interface as well as a primary rate interface.

In a preferred embodiment the control information to select the appropriate synchronizing signal is sent over the system bus. However, only four bits are required to uniquely designate up to sixteen circuits, whereas with phase status words approximately 16 bits per circuit were required.

BRIEF DESCRIPTION OF THE DRAWINGS

The invention will now be described in more detail, by way of example only, with reference to the accompanying drawings, in which.

DESCRIPTION OF THE PREFERRED EMBODIMENT

Figure 1:
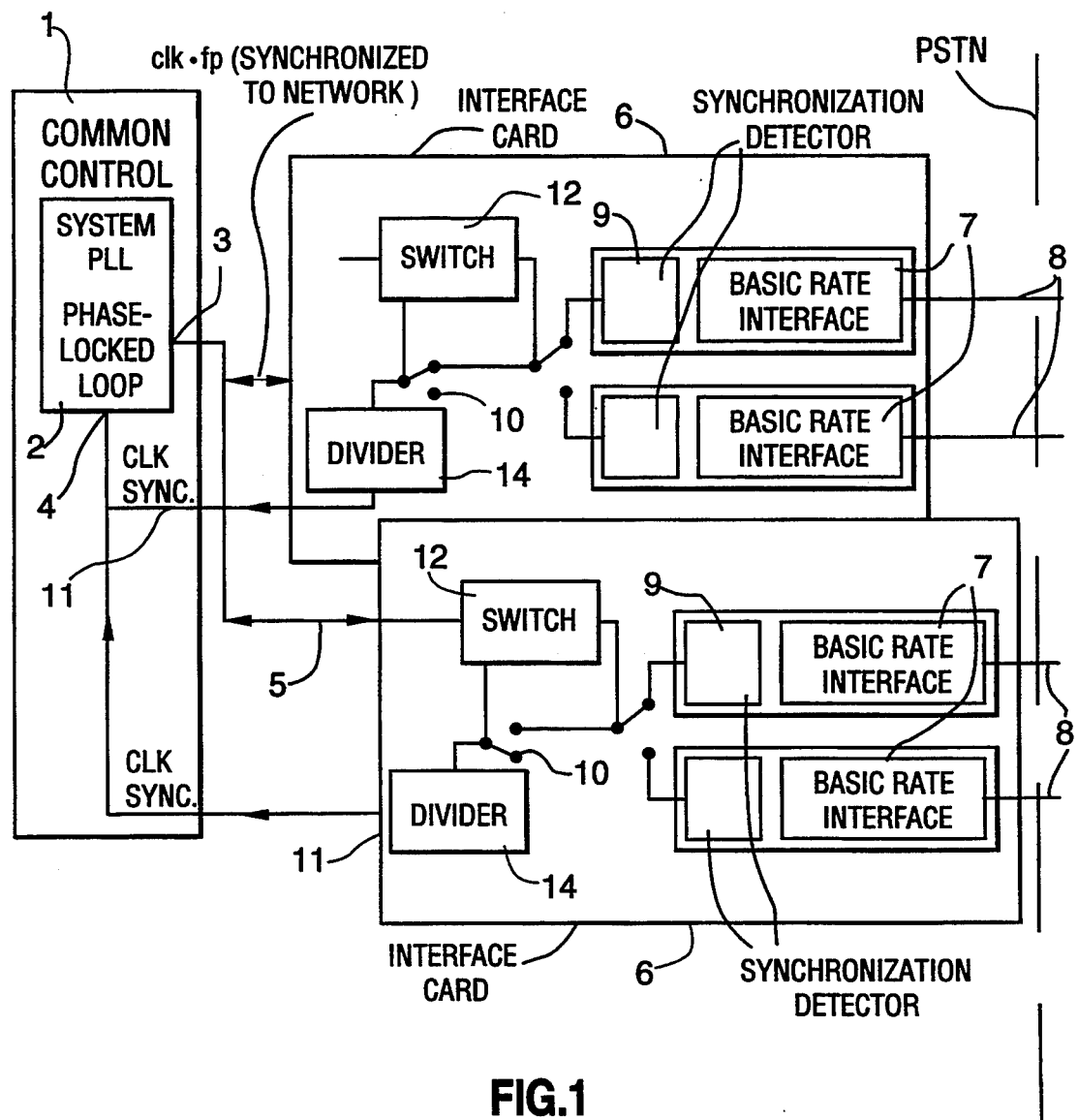
FIG. 1 is a block diagram of an arrangement for synchronizing a system clock with basic rate interface cards in accordance with the invention.

Referring now to FIG. 1, the digital switching system, which might be installed in a small office or home provided with several ISDN digital circuits, comprises a common control unit 1 including a phase locked loop system clock 2 that has an output 3 producing clock signals and framing pulses for the system bus, which will be described in more-detail below.

The phase loop 2 has a synchronization input 4 and will synchronize to clock pulses appearing on the input 4.

The control unit 1 is connected over system bus 5, which is a 2,048 Mbps ST bus, to basic rate interface cards 6, each comprising a pair of basic rate interface units 7. The basic rate interface units 7 are connected to respective basic rate (2B+D) 192 kps circuits 8 connected to the public network. Each circuit 8 can be in the form of a standard twisted pair line. Modern echo cancelling techniques allow such a line to carry digital signals at the basic rate.

In accordance with the invention, each interface card 6 carries a circuit 9, which in reality is included in the circuitry of basic rate interface unit 7, for detecting the synchronization signals on the basic rate circuit 8.

The synchronization signals are fed through cascaded switches 10 to clock synchronization lines 11 leading to the synchronization input 4 of the system phase locked loop 2.

Each interface card 6 is provided with a control circuit 12 that sets the switches 10 so that only the active interface unit 7 is connected to the clock synchronization input 4. The control circuits 12 are controlled by information nested within an overhead channel on the ST bus. However, since this information merely designates the active circuit, only four bits are required to designate a total of sixteen circuits. Three bits will of course designate eight circuits and so on.

Figure 2:
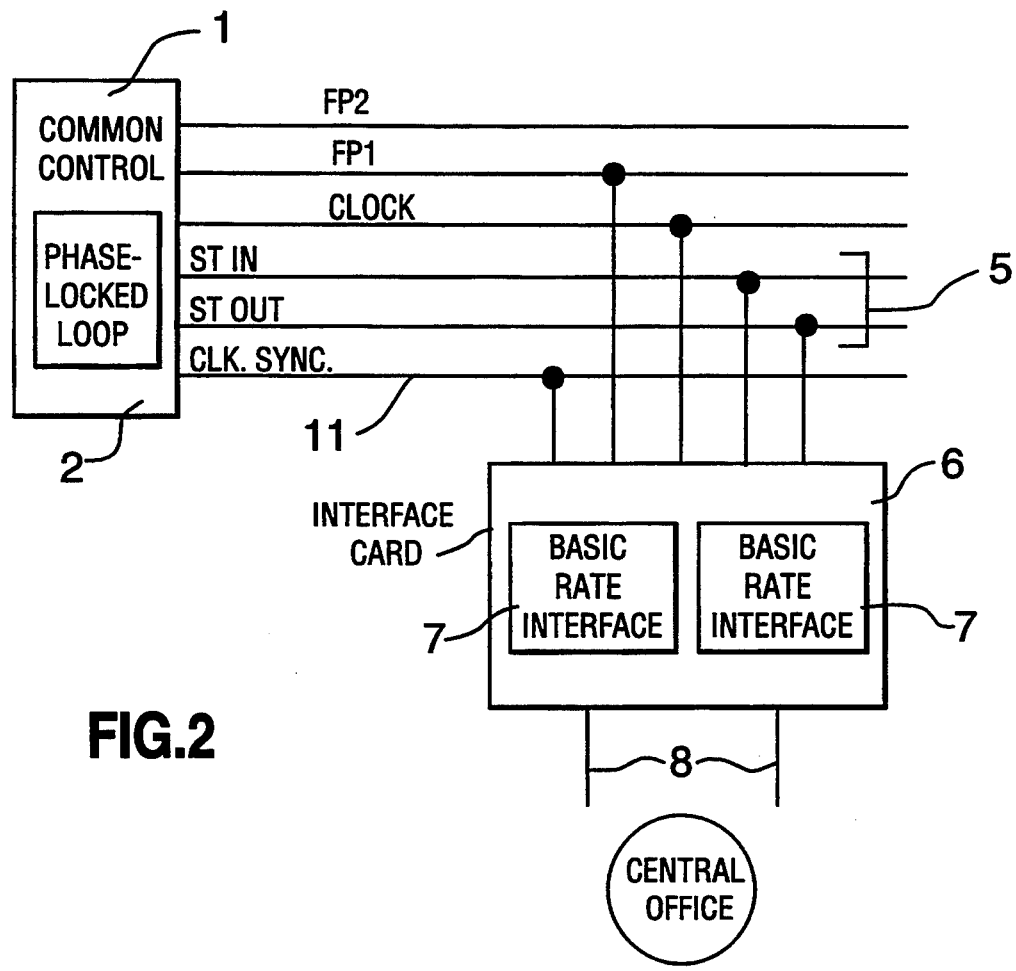
FIG. 2 is a block diagram illustrating in more detail the interconnections between a basic rate interface card and the system control unit.

FIG. 2 illustrates the connection between interface card 6 and the control unit 1. The card 6 is connected directly to the phase locked loop 2 over the clock synchronization line 11 so as to permit the system to be brought into synchronization with the clock signal on the basic rate circuits 8. These circuits have a clock frequency of 1.536 Mhz. The control information is passed to the cards 7 via the ST bus 5. Each card 6 includes dividing logic circuitry 14, which lowers the 1.536MHz signal to 8 KHz to further reduce radiation emissions.

Figure 3:
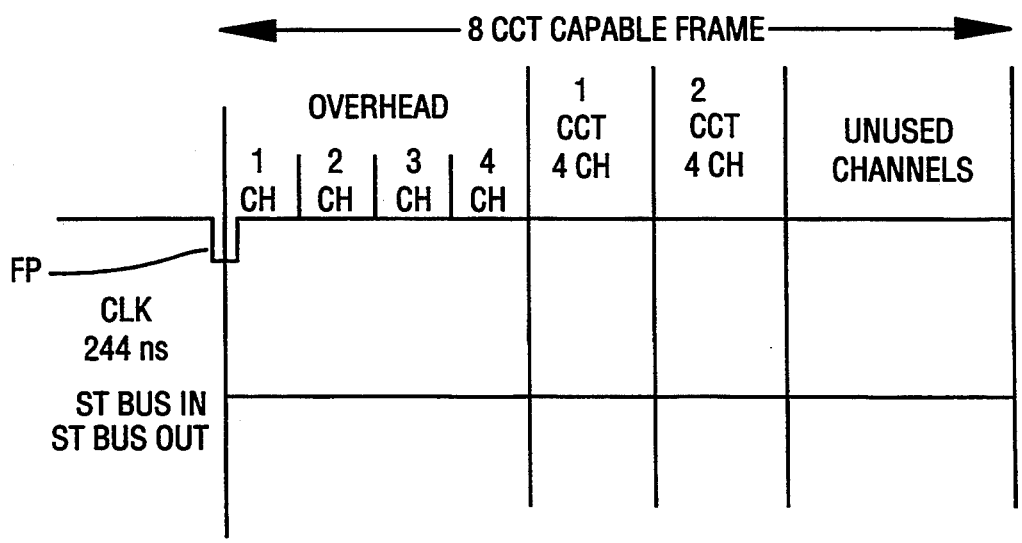
FIG. 3 is a diagram of an ST bus frame carrying control information in accordance with the invention.

FIG. 3 shows the breakdown of a thirty-two channel frame on the ST bus. The bus has the capability of being connected to eight circuits, each circuit having four channel capability. The overhead information determining the active circuit can be transmitted in the first channel, since four bits are sufficient to designate up to sixteen circuits. With the prior art arrangement, each circuit required a sixteen bit phase status word, which therefore took up substantial bandwidth.

With the described arrangement, there are various other advantages. The software control of the phase locked loop can be carried out with low level handling routines, resulting in improved clock frequency tracking. Also, the phase locked loop can be implemented in the form of a low cost analog device.

A further advantage of the described arrangement is that ponderation (or averaging) of clock source frequencies can be easily handled by periodically switching between the clock sources.

I claim:

1. A digital switching system comprising:
    a) a plurality of digital interface means for connection to a public telecommunications network, each said digital interface means including at least one digital interface circuit with a synchronization detector for detecting a network synchronization signal;
    b) a control unit including a system clock having a clock synchronization input;
    c) a system bus for carrying data through the switching system and connected between said interface means and said control unit; and
    d) switch means in said interface means, said switch means being operative in response to control data from said control unit and carried over said system bus in an overhead channel to connect the synchronization detector of a selected said digital interface circuit, which constitutes an active interface unit, to said clock synchronization input of said system clock over a clock synchronization line so as to pass detected synchronization signals on said active interface circuit directly thereto;
    whereby said system clock can be brought directly into synchronization with the detected synchronization signal of the active interface circuit.

2. A switching system as claimed in claim 1, wherein said digital interface circuits comprise basic rate circuits in an ISDN system, and said switch means comprise a plurality of switches connected to respective groups of basic rate interface circuits in each said interface means.

3. A switching system as claimed in claim 1, wherein said system bus is a standard 2,048 mbps serial telephone bus with 32 channel frames, and said control data are sent in the first channel of each frame.

4. A switching system as claimed in claim 1, further comprising divider means in said digital interface means for dividing the detected synchronization signal to a lower frequency so as to reduce radiated electromagnetic interference.

* * * * *